United States Patent
Lee et al.

(10) Patent No.: US 7,003,518 B2
(45) Date of Patent: Feb. 21, 2006

(54) MULTIMEDIA SEARCHING METHOD USING HISTOGRAM

(75) Inventors: Jin-Soo Lee, Seoul (KR); Hyeon-Jun Kim, Sung-Nam-shi (KR)

(73) Assignee: LG Electronics Inc., Seoul (KR)

( * ) Notice: Subject to any disclaimer, the term of this patent is extended or adjusted under 35 U.S.C. 154(b) by 251 days.

(21) Appl. No.: 09/948,936

(22) Filed: Sep. 10, 2001

(65) Prior Publication Data

US 2002/0062309 A1    May 23, 2002

(30) Foreign Application Priority Data

Sep. 8, 2000    (KR) ............................... 2000-53313

(51) Int. Cl.
*G06F 17/30* (2006.01)

(52) U.S. Cl. ................ 707/6; 707/104.1; 707/101; 707/3; 382/162

(58) Field of Classification Search ................ 707/100, 707/102, 5, 2, 3, 104, 101, 6, 103; 715/501.1; 382/166, 162; 345/585; 358/515
See application file for complete search history.

(56) References Cited

U.S. PATENT DOCUMENTS

| | | | | |
|---|---|---|---|---|
| 5,802,361 A | * | 9/1998 | Wang et al. ................ 382/217 |
| 5,806,061 A | * | 9/1998 | Chaudhuri et al. ............ 707/3 |
| 5,873,080 A | * | 2/1999 | Coden et al. ................... 707/3 |
| 5,893,095 A | * | 4/1999 | Jain et al. ...................... 707/6 |
| 5,911,139 A | * | 6/1999 | Jain et al. ....................... 707/3 |
| 5,915,250 A | * | 6/1999 | Jain et al. .................... 707/100 |
| 5,987,468 A | * | 11/1999 | Singh et al. ................. 707/100 |
| 6,154,746 A | * | 11/2000 | Berchtold et al. ........... 707/100 |
| 6,233,367 B1 | * | 5/2001 | Craver et al. ................ 382/305 |
| 6,411,724 B1 | * | 6/2002 | Vaithilingam et al. ....... 382/100 |
| 6,556,723 B1 | * | 4/2003 | Craver et al. ................ 382/294 |
| 6,597,738 B1 | * | 7/2003 | Park et al. ............. 375/240.16 |
| 6,628,846 B1 | * | 9/2003 | Craver et al. ................ 382/305 |
| 6,708,167 B1 | * | 3/2004 | Lee et al. ........................ 707/6 |
| 6,757,675 B1 | * | 6/2004 | Aiken et al. .................... 707/3 |
| 6,813,394 B1 | * | 11/2004 | Matsumoto et al. ......... 382/305 |
| 6,850,639 B1 | * | 2/2005 | Song et al. .................. 382/162 |
| 6,919,971 B1 | * | 7/2005 | Lee et al. ...................... 358/1.9 |
| 2003/0004966 A1 | * | 1/2003 | Bolle et al. .............. 707/104.1 |
| 2003/0120647 A1 | * | 6/2003 | Aiken et al. .................... 707/3 |
| 2003/0195883 A1 | * | 10/2003 | Mojsilovic et al. ............ 707/6 |

* cited by examiner

*Primary Examiner*—Jean M. Corrielus
(74) *Attorney, Agent, or Firm*—Fleshner & Kim, LLP

(57) ABSTRACT

Disclosed is a multimedia searching method and apparatus that can achieve a high performance and provide a interoperability by defining a histogram using uniformly quantized bin values as a standard histogram, and a comparative search can be performed using a search histogram having non-uniformly-quantized bin values based on the standard histogram. The non-uniformly quantized bin values of the search histogram can be determined for each application by non-uniformly combining the uniformly-quantized bin values. According to a method, the histogram is defined as a standard histogram, and a comparative search is performed by converting the standard histogram. Further, a standard histogram obtained by uniformly quantizing a given color space can be converted into a search histogram (e.g., determined for a certain application) by non-uniformly combining the bins obtained by uniformly quantizing the color space into the N partial regions.

25 Claims, 4 Drawing Sheets

MULTIMEDIA SEARCHING METHOD USING HISTOGRAM

BACKGROUND OF THE INVENTION

1. Field of the Invention

The present invention relates to a multimedia search. More particularly, the present invention relates to a method for performing a multimedia search using a histogram such as a color histogram as a multimedia feature for the search.

2. Description of the Related Art

Recently, various techniques for a content-based multimedia search have been introduced. In those techniques, a histogram such as a color histogram is generally used for the search. The histogram represents feature distribution of the multimedia, and especially, the color histogram is considered as the most important feature information among various histograms used for the search.

The color histogram is the information that represents color distribution of the multimedia data such as an image, and the number of bins for the histogram is determined based upon how a color space is quantized.

Generally, the respective bin values are expressed by fractions. However, for a higher performance and spatial efficiency, the bin values can be expressed by N bits whose space is smaller than a fraction-expressed space. For instance, it is generally known that the space can be saved without deteriorating any substantial performance if fractional values in the range of 0 to 1 are expressed by 8-bit, i.e., 256 numerical values. As explained above, the quantization of the color space and the quantization of the histogram bin value should be considered in describing the color histogram.

The method of quantizing the bin value or the color space can be classified into a uniform quantization and a non-uniform quantization.

The uniform quantization means a uniform division of the bin value or the color space based on a reference axis of quantization, while the non-uniform quantization means a non-uniform division of the bin value or the color space.

For example, in case of the bin value quantization, the method of uniform quantization divides the values in the range of 0 to 1 by a uniform width to uniformly quantize the values, while the method of non-uniform quantization divides the values by a non-uniform width to non-uniformly quantize the values.

The non-uniform quantization method can achieve a higher search performance than the uniform quantization method or the method of describing fractional values as they are. For example, the search performance can be increased if a section having relatively important bin values is closely divided and a section having non-distinctive bin values is sparsely divided in describing the multimedia feature.

For example, in case of the histogram, most of the bin values are smaller than 0.2. So, it is meaningless to closely divide the bin values larger than 0.2.

Also, in case of the color space quantization, there exist portions where color points that constitute the multimedia data are concentrated or sparse in the whole color space, and the search performance can be increased by more closely dividing the concentrated portion.

The non-uniform quantization method has a relative advantage as explained above. However, the non-uniform quantization method has a problem that it should be applied as a different format for respective applications.

First, let's consider the color space quantization. In case of a general photograph, most of colors are concentrated in a region that purity is low. So, it is advantageous for the search to divide the region of the low purity. However, in case of the multimedia such as an animation, the colors are concentrated in a region of high purity. Also, in case of a black and white image such as a medical image, only black and white region in the whole color space is used for search, and thus it is not required to divide most of other color regions.

Also, in case of the bin value quantization, most of bin values are distributed in a region that the bin values are smaller than 0.2. However, in an exceptional case such as the medical image, the colors are concentrated in the black and white region, and thus bins having values larger than those of other multimedia may be produced.

As described above, in order to obtain the optimum performance, different type of color space quantization or bin value quantization should be applied for respective applications.

However, if different quantization method is applied for respective applications, a compatibility problem occurs. In other words, it is impossible to identify and search data quantized by the different quantization methods.

Meanwhile, standardization activities have been progressed to enables multimedia data search, irrespective of the kinds of data providing servers. For the purpose of the standardization, however, it is very difficult to use the non-uniform quantization method. Accordingly, it is required to provide a desired search method having high-performance, satisfying an interoperability that the standardization aims as well as providing the optimum feature information for respective applications.

SUMMARY OF THE INVENTION

Therefore, an object of the invention is to solve the above problems and/or disadvantages and to provide at least the advantages described hereinafter.

An object of the invention is to provide a multimedia searching method using a histogram, which can search the multimedia data irrespective of the kind of data providing servers, and provide an optimized histogram for each application.

It is another object of the present invention to provide a multimedia searching method using histogram, which can perform a comparative search between the data quantized by different method.

To achieve the above object, the present invention provides a multimedia searching method using histogram as a feature, that defines a standard histogram by uniformly dividing information for expressing the histogram as the feature information, or by uniformly dividing some regions as closely and other regions as sparsely based on a specified threshold value, and then converts the standard histogram into an optimized histogram having non-uniformly-divided feature information optimized for a certain application by non-uniformly combining the uniformly-divided information using the standard histogram.

In one aspect of the present invention, there is provided a multimedia searching method using a histogram that express a feature of the multimedia, comprising the steps of, (a) uniformly dividing the histogram; and (b) performing a search by directly using the uniformly-divided histogram or by non-uniformly combining the uniformly-divided histogram in accordance with an object group to be searched.

In this multimedia searching method of the present invention, if the object group to be searched is a single object group, the uniformly-divided histogram is non-uniformly combined and used to match a characteristic of the histogram, while, if the object group is not the single object group and it is difficult to define the characteristic of the histogram, the uniformly-divided histogram is used as it is.

In another aspect of the present invention, there is provided a multimedia searching method using a histogram that express a feature of the multimedia, comprising the steps of, (a) uniformly dividing information for expressing the histogram; (b) non-uniformly combining the uniformly-divided histogram information to be optimized for a specified application; and (c) performing a multimedia search for the corresponding specified application using the non-uniformly-combined histogram information.

In this multimedia searching method of the present invention, the uniform division is performed for whole regions of the information for expressing the histogram.

Also, in this multimedia searching method of the present invention, the uniform division is performed by uniformly dividing at least two regions divided based on a specified threshold value of the information for expressing the histogram in different numbers for respective region.

In still another aspect of the present invention, there is provided a multimedia searching method using a histogram that respective bin values are expressed by N bits, wherein the method comprising the steps of (a) defining the histogram using the bin values uniformly quantized (i.e., uniformly divided) into $2^N$ as a standard histogram, (b) converting the standard histogram into a histogram having non-uniformly-quantized bin values optimized for a specified application by non-uniformly combining the uniformly-quantized (i.e., uniformly-divided) bin values of $2^N$, and (c) performing a comparative search using the converted histogram.

In this multimedia searching method of the present invention, the step of non-uniformly combining the uniformly-quantized (i.e., uniformly-divided) bin values of $2^N$ is implemented by converting the uniformly-quantized bin values into the non-uniformly-quantized bin values in a manner that as the bin values become closer to 0, the bin values are more closely quantized by combining the smaller number of the uniformly-divided bin values as close to 0 as the values are.

In still another aspect of the present invention, there is provided a multimedia searching method using a histogram that respective bin values are expressed by N bits, wherein the method comprising the steps of (a) defining the histogram using the bin values obtained by a semi-uniform quantization for the bin values of $2^N$ as a standard histogram, wherein the semi-uniform quantization performs a close uniform division for the bin values lower than a specified threshold value and performs a sparse uniform division for the bin values higher than the specified threshold value, (b) converting the standard histogram into a histogram having non-uniformly-quantized bin values optimized for a specified application by non-uniformly combining the quantized bin values of $2^N$ and (c) performing a comparative search using the converted histogram.

In this multimedia searching method of the present invention, the step of non-uniformly combining the quantized bin values of $2^N$ is implemented by converting the uniformly-quantized bin values into the non-uniformly-quantized bin values in a manner that as the bin values become closer to 0, the bin values are more closely quantized by combining the smaller number of the uniformly-divided bin values as close to 0 as the values are.

In still another aspect of the present invention, there is provided a multimedia searching method using a histogram having N bins obtained by dividing a color space into N partial regions, wherein the method comprising the steps of (a) defining the histogram obtained by uniformly quantizing (i.e., uniformly dividing) the given color space into the N partial regions as a standard histogram, (b) converting the standard histogram into a histogram having the bins representing the non-uniformly-quantized color space optimized for a specified application by non-uniformly combining the bins obtained by uniformly quantizing (i.e., uniformly dividing) the color space into the N partial regions, and (c) performing a comparative search using the converted histogram.

In this multimedia searching method of the present invention, the step of non-uniformly combining the bins representing the color space uniformly-quantized (i.e., uniform-divided) into the N regions is implemented in a manner that the regions having a lower purity are more closely quantized based on brightness and purity axes by combining a smaller number of the uniformly-divided values based on the brightness and purity axes.

In this multimedia searching method of the present invention, the step of non-uniformly combining the bins representing the color space uniformly-quantized (i.e., uniform-divided) into the N regions is implemented in a manner that the regions having a lower purity are more sparsely quantized based on a hue by combining a larger number of the uniformly-divided values based on the hue.

In still another aspect of the present invention, there is provided a multimedia searching method using a histogram having N bins obtained by dividing a color space into N partial regions, wherein the method comprising the steps of (a) defining the histogram obtained by more closely uniform-quantizing (i.e., uniform-dividing) the color space in the regions having a purity lower than a specified threshold value and by more sparsely uniform-quantizing the color space in the regions having a purity higher than the specified threshold value as a standard histogram, (b) converting the histogram into a histogram having the bins representing the non-uniformly-quantized color space optimized for a specified application by non-uniformly combining the bins obtained by quantizing the color space into the N partial regions, and (c) performing a comparative search using the converted histogram.

In this multimedia searching method of the present invention, the step of non-uniformly combining the bins representing the color space quantized into the N regions is implemented in a manner that the regions having a lower purity are more closely quantized based on brightness and purity axes by combining a smaller number of the uniformly-divided values based on the brightness and purity axes.

In this multimedia searching method of the present invention, the step of non-uniformly combining the bins representing the color space uniformly quantized into the N regions is implemented in a manner that the regions having a lower purity are more sparsely quantized based on a hue by combining a larger number of the uniformly-divided values based on the hue.

BRIEF DESCRIPTION OF THE DRAWINGS

The present invention will be described in detail with reference to the following drawings in which like numerals refer to like elements wherein.

DETAILED DESCRIPTION OF THE PREFERRED EMBODIMENTS

Hereinafter, preferred embodiments of the present invention will be described in detail.

A multimedia searching method using a histogram according to the present invention will be described with respect to a preferred embodiment illustrated in the annexed drawings.

Specifically, the bin value quantization applicable to a general histogram will be first explained, and then the color space quantization applicable to a color histogram will be explained.

[Standard Uniform Bin-value-quantization Histogram]

In order that two different histograms can be comparable with each other in the bin value quantization, the reference threshold value used for the quantization should be shared.

For example, when the bin values of the two histograms are quantized, if the bin values of one histogram are divided into two parts based on a threshold of 0.2, the bin values of the other histogram should be also divided into two parts based on the same threshold. One of such methods using the same threshold value is a uniform bin value quantization.

Generally, 8 bits are enough to express fractional values in the range of 0 to 1, and the basic uniform bin value quantization is a method that the values in the range of 0 to 1 are uniformly divided into 256 units.

In other words, if the histograms of multimedia data are expressed by uniformly dividing values in the range of 0 to 1 by 8 bits, they are comparable with each other.

However, as described above, such an expression cannot achieve an optimal performance in a specified application.

For the optimal performance, the non-uniform bin value quantization should be performed. Generally, a 4-bit expression can achieve a very high performance.

The 4-bit expression divides the bin values into 16 cases, and this is very small number in comparison to the 8-bit expression. Thus, by combining the 256 uniform-divided values into different numbers, an effect same as performing of the non-uniform quantization can be obtained.

Figure 1:
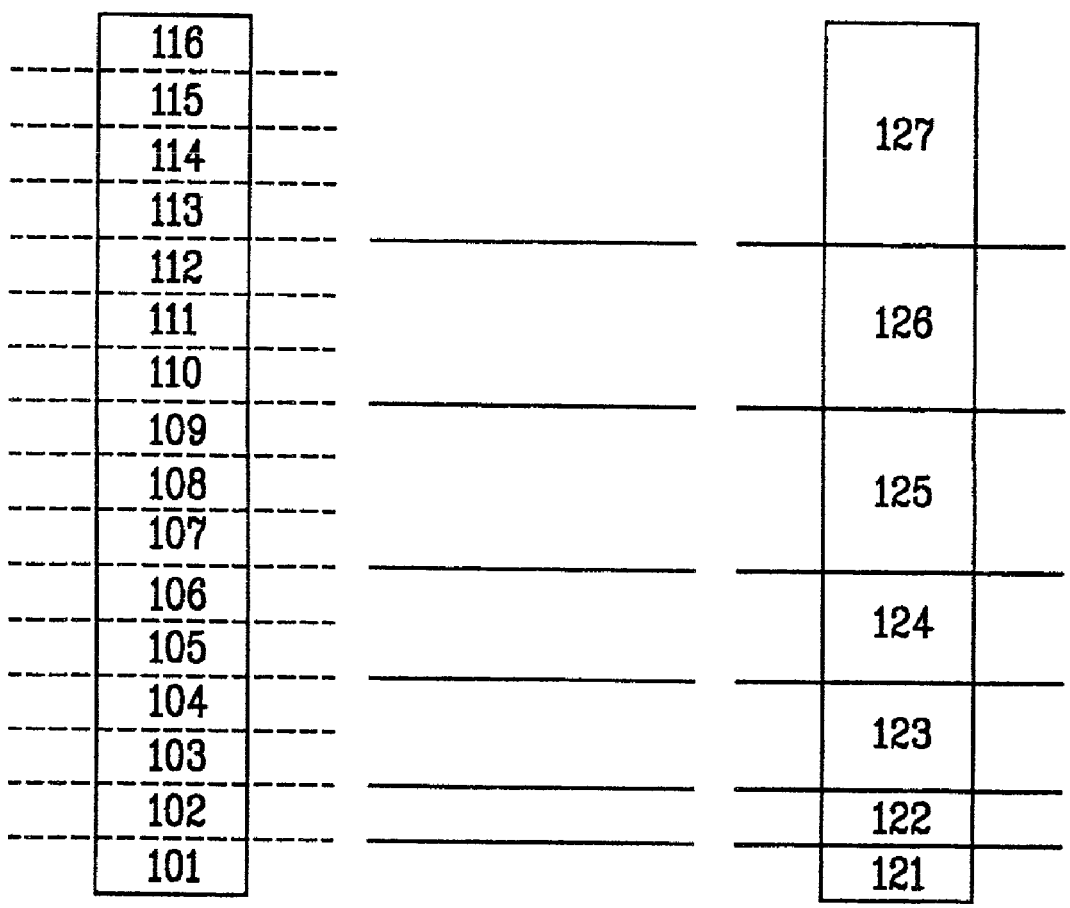
FIGS. 1a and 1b are views illustrating the number of bin value quantization for explaining a first embodiment of the present invention.

FIGS. 1a and 1b show an example of the above-described concept. FIG. 1a shows the result of the uniform division, and FIG. 1b shows the result of the non-uniform combination of the uniformly divided values, which actually indicates the effect same with the non-uniform division.

Specifically, FIG. 1a is a case that the bin values are uniformly-divided into 16 units of 101 to 116, while FIG. 1b is a case that the bin values are non-uniformly divided into 7 units of 121 to 127 by non-uniformly combining the uniformly-divided values.

That is, as shown in FIG. 1a and FIG. 1b, the combining is performed in a manner that 101→121, 102→122, 103+104→123, 105+106→124, 107+108+109→125, 110+111+112→126, and 113+114+115+116→127, respectively, to effect the non-uniform division.

At this time, since the non-uniform division is performed by combining the uniformly-divided values (as shown as solid lines in FIG. 1b), the number N expressing the non-uniformly-divided values is always smaller than the number N' expressing the initial uniformly-divided values. Also, the partial region having the smallest range in the non-uniform division is always equal to or larger than that in the uniform division.

As described above, the process of combining the uniformly divided values and converting then into the non-uniformly divided values is not complicated, and thus it can be directly performed during the search for the multimedia data such as the image.

Accordingly, a uniform-bin-value-quantized histogram having 256 initial uniform-divided values is used as the standard histogram requiring the compatible operation, and in case that the histogram is used for the search in a limited range in a specified application, the bin values of the histogram are combined to match the application, so that the non-uniformly quantized histogram is used for the search.

In other words, though the respective multimedia data as the feature information have uniform-bin-value-quantized histograms, respective application programs are provided with information on bin value combining to match the corresponding applications in advance, and thus the bin values combined and converted can be used for the search.

[Standard Semi-Uniform Bin-Value-Quantization Histogram]

As described above, when the 256 units of uniformly divided bin values are converted into the non-uniformly divided bin values by combining the uniformly divided bin values, the possible minimum range of the non-uniformly divided bin value is equal to that of the 256 units of uniformly divided bin values, i.e., $1/256$.

However, the range of the minimum bin value used in the optimal non-uniform quantization may be smaller than $1/256$. Accordingly, initial uniform division may be more closely performed to satisfy this required minimum range. But, this is not efficient because more bits are required for expressing the bin values.

Meanwhile, instead of using the complete uniformly divided bin values as the standard histogram, a semi-uniform quantization that performs a uniform division more closely in the region lower than a specified threshold value may be used. This quantization method is not a complete uniform quantization, but it is a semi-uniform quantization method that is much simpler than the non-uniform quantization optimized for each application and can be used irrespective of its types of application.

Figure 2:
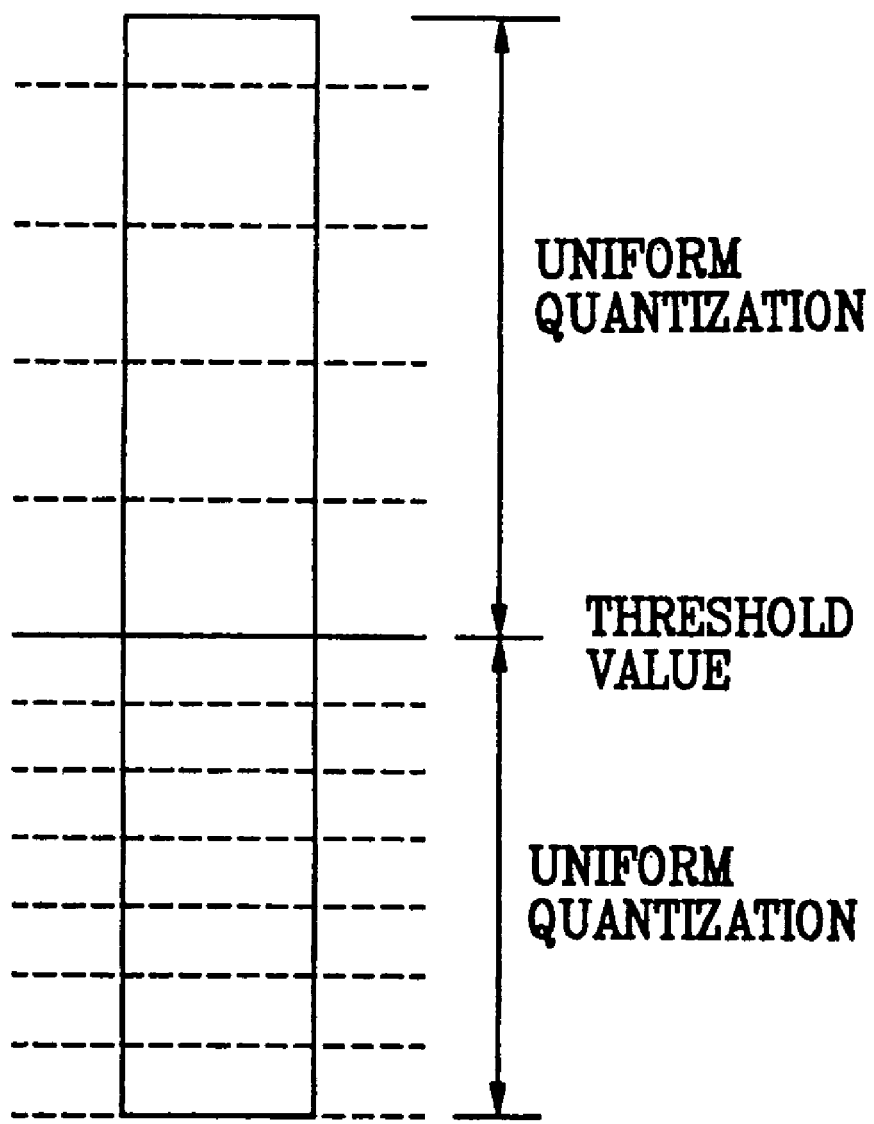
FIG. 2 is a view illustrating the number of bin value quantization for explaining a second embodiment of the present invention.

Specifically, the bin values in the range of 0 to 1 are divided into two regions, and one region having the low value is uniformly divided into N, while the other region having the high value is uniformly divided into M (<<N). In this case, the semi-uniform quantization can be optimized to achieve a higher performance because the possible minimum range is smaller than $1/256$ when the initial histogram bin values are combined. FIG. 2 shows an example of such a semi-uniform bin value quantization.

As shown in FIG. 2, the bin values in the range of 0 to 1 are divided into two regions, and one region having the value lower than the threshold value is uniformly divided (i.e., quantized) into 7 units, while the other region having the value higher than the threshold value is uniformly divided into 5 units.

As described above, the bin value quantization method that obtains the optimal histogram by constructing the standard histogram and converting the standard histogram has been explained.

Meanwhile, in case of a color histogram, the histogram may be constructed by quantizing a given color space. At this time, the quantizarion of the color space is performed in a manner that a basic quantized histogram is constructed as a standard histogram, and this histogram is converted into a non-uniform color-space-quantized histogram by combining bins of the histogram.

[Standard Uniform Color-Space-Quantization Histogram]

In case of the color space quantization, the standard uniform color space quantization histogram is constructed in the same manner as the bin value quantization, and then the non-uniform quantization histogram is constructed using the standard uniform color space quantization histogram.

Figure 3A:
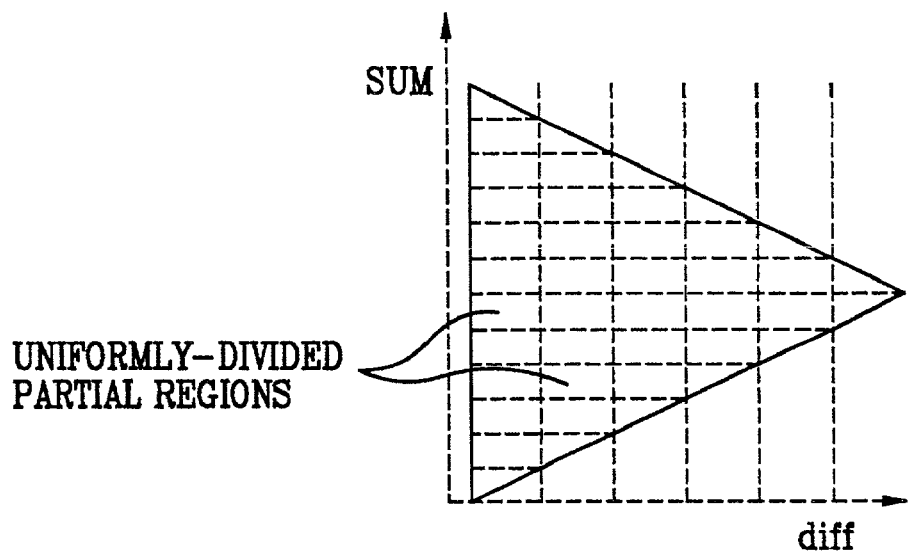
FIGS. 3a and 3b are views explaining the standard uniform color space quantization according to the present invention.
Figure 3B:
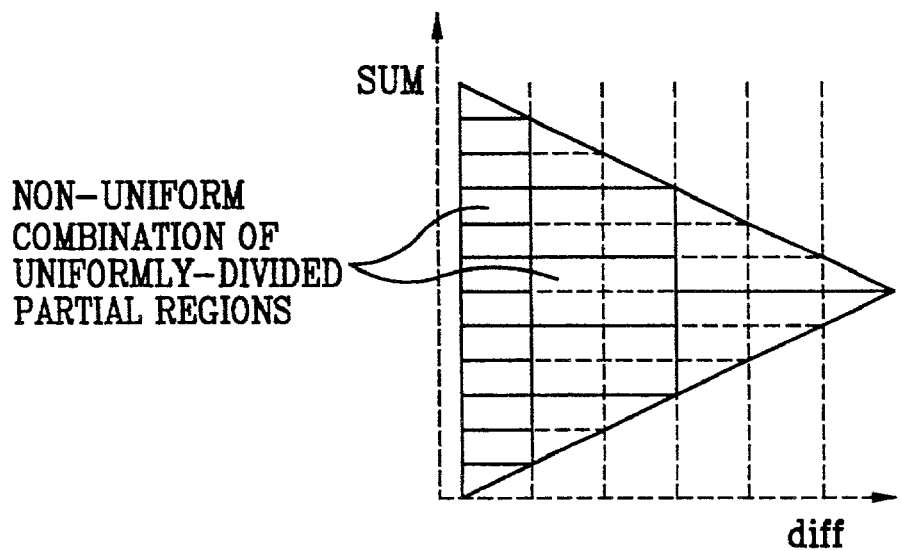

FIGS. 3a and 3b explain the standard uniform color space quantization according to the present invention applied to the HMMD color space.

As shown in FIG. 3a, the standard color space quantization histogram is constructed to be included as the multimedia feature information by uniformly dividing the given color space based on each axe (diff and sum).

Thereafter, in order to construct the optimal non-uniform color-space-quantization histogram for the respective applications, the uniformly divided color space regions of FIG. 3a are non-uniformly combined as shown in FIG. 3b.

At this time, the non-uniform combination is performed by combining the uniformly divided values as shown as solid lines of FIG. 3b.

As shown in the drawings, this method causes an effect that the regions having lower purity are more closely divided by combining much more partial regions in the region having the high purity. For easy understanding, the drawings describe that the combination is performed on the color space, but in practice, the respective bins of the histogram obtained by the uniform division are combined. These methods have same meaning because each bin of the histogram is 1:1 matched to each divided region in the drawing.

[Standard Semi-uniform Color-Space-Quantization Histogram]

As same as the bin values, when the non-uniform color space histogram is produced using the uniform color space histogram, the possible minimum range of the partial region is the range of one divided region of the uniform color space histogram.

Accordingly, it is required that the minimum range of the divided region is smaller than the space size of one divided region of the uniform color space histogram during the optimization, and thus the histogram obtained by the semi-uniform color space quantization can be used as the standard histogram.

Figure 4:
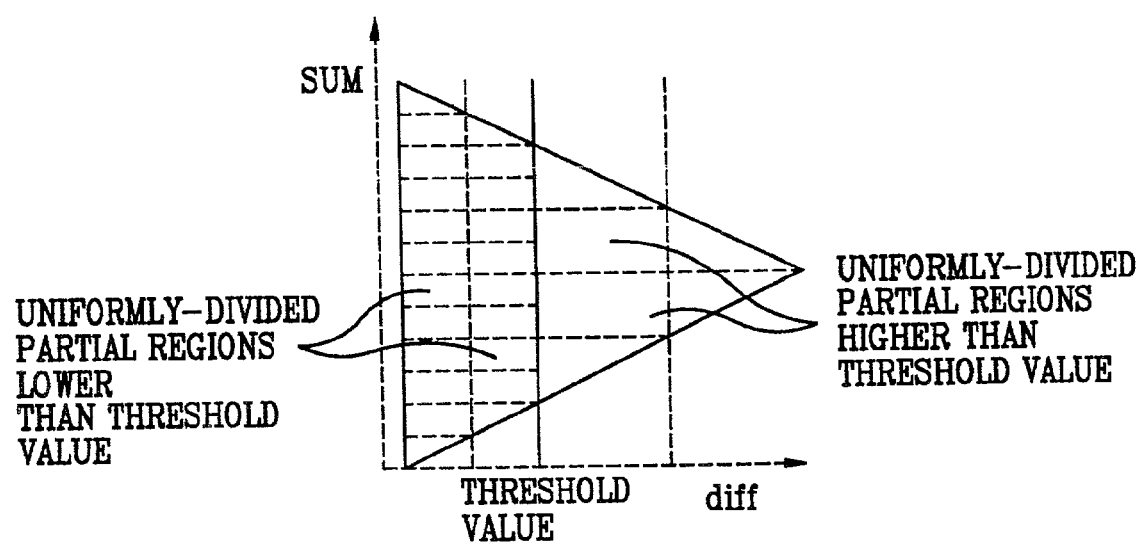
FIG. 4 is a view explaining the standard semi-uniform color space quantization according to the present invention.

FIG. 4 shows the standard histogram obtained by the semi-uniform color space quantization. As shown in FIG. 4, a close uniform-division is performed with respect to the regions that the purity is lower than the threshold value, and a sparse uniform-division is performed with respect to the regions that the purity is higher than the threshold value.

As described above, the multimedia searching method using a histogram such as a color histogram according to the present invention considers both the standardization that enables the search between different data providing servers and the high performance that can be achieved only using the optimized feature information for each application. Thus, the method according to the present invention enables the comparative search of the multimedia irrespective of the kind of data providing server and achieves a high performance by using the optimized feature information for respective applications. In other words, the present invention provides an advantage that performs a comparative search between the multimedia data quantized by different method. Accordingly, the present invention provides a solution of the actual standardized application by conforming to the merits of the standardization that is on the present-day trend as well as it has the advantage of the existing system optimized for the respective applications.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A computer-implemented multimedia searching method using a second histogram that expresses feature information of multimedia, comprising:
   uniformly dividing a first histogram using a range value; and
   performing a search using the second histogram, wherein the second histogram is generated by non-uniformly combining the uniformly-divided first histogram in accordance with the range value.

2. The method as claimed in claim 1, wherein the second non-uniformly-divided histogram is converted in accordance with an object group to be searched.

3. The method as claimed in claim 2, wherein if the object group to be searched is a single object group, the first uniformly-divided histogram is non-uniformly combined and used to match a characteristic of the histogram, while if the object group is not the single object group and it is difficult to define the characteristic of the histogram, the first uniformly-divided histogram is used.

4. The method as claimed in claim 1, wherein the first histogram is obtained by dividing a color space into N partial regions.

5. A computer-implemented multimedia searching method using a histogram that expresses feature information of multimedia, comprising:
   uniformly dividing information for expressing the histogram;
   non-uniformly converting the uniformly-divided histogram information according to a specified application; and
   performing a multimedia search for the corresponding specified application using the non-uniformly-converted histogram information.

6. The method as claimed in claim 5, wherein the uniform division is performed for whole regions of the information for expressing the histogram.

7. The method as claimed in claim 5, wherein the uniform division is performed by uniformly dividing at least two regions based on a threshold value of the information for expressing the histogram in different numbers for the respective regions.

8. The method as claimed in claim 5, wherein the multimedia searching method is performed in a case where the histogram is used for a multimedia search in a limited range in the specified application, and wherein the non-uniformly-converted histogram information is determined for each specified application.

9. A computer-implemented multimedia searching method using a histogram that respective bin values are expressed by N bits, the method comprising:
   forming a histogram using the bin values uniformly-quantized into $2^N$ as a standard histogram; and
   converting the standard histogram into a converted histogram having non-uniformly-quantized bin values corresponding to a specified application by non-uniformly combining the $2^N$ uniformly-quantized bin values; and performing a comparative search using the converted histogram.

10. The method as claimed in claim 9, wherein the non-uniformly combining the uniformly-quantized bin values of $2^N$ is implemented by converting the uniformly-quantized bin values into the non-uniformly-quantized bin values in a manner that as the bin values become closer to 0, the bin values are more closely quantized by combining the smaller number of the uniformly-divided bin values as close to 0 as the values are.

11. The method as claimed in claim 9, wherein the non-uniformly combining the uniformly-quantized bin values of $2^N$ is implemented by converting the uniformly-quantized bin values into the non-uniformly-quantized bin values in a manner that bin values greater than a threshold are more closely quantized than remaining bin values less than the threshold.

12. The method as claimed in claim 9, wherein the histogram is obtained by dividing a color space into N partial regions.

13. The method as claimed in claim 9, wherein a plurality of converted histograms are predetermined before the comparative search is performed.

14. A computer-implemented multimedia searching method using a histogram that respective bin values are expressed by N bits, the method comprising:
(a) defining the histogram using the bin values obtained by performing a semi-uniform quantization for the bin values of $2^N$ as a standard histogram, wherein the semi-uniform quantization performs a close uniform division for the bin values lower than a threshold value and performs a sparse uniform division for the bin values higher than the threshold value;
(b) converting the standard histogram into a histogram having non-uniformly-quantized bin values optimized for a specified application by non-uniformly combining the quantized bin values of $2^N$; and
(c) performing a comparative search using the converted histogram.

15. The method as claimed in claim 14, wherein the step of non-uniformly combining the quantized bin values of $2^N$ is implemented by converting the uniformly-quantized bin values into the non-uniformly-quantized bin values in a manner that as the bin values become closer to 0, the bin values are more closely quantized by combining the smaller number of the uniformly-divided bin values as close to 0 as the values are.

16. A computer-implemented multimedia searching method using a histogram having N bins obtained by dividing a color space into N partial regions, the method comprising:
defining the histogram obtained by uniformly quantizing the given color space into the N partial regions as a standard histogram;
converting the standard histogram into a histogram having the bins representing the non-uniformly-quantized color space corresponding to a specified application by non-uniformly combining the bins obtained by uniformly quantizing the color space into the N partial regions; and
performing a comparative search using the converted histogram.

17. The method as claimed in claim 16, wherein the non-uniformly combining the bins representing the color space uniformly-quantized into the N regions is implemented in a manner that the regions having a lower purity are more closely quantized based on brightness and purity axes by combining a smaller number of the uniformly-divided values based on the brightness and purity axes.

18. The method as claimed in claim 16, wherein the non-uniformly combining the bins representing the color space uniformly-quantized into the N regions is implemented in a manner that the regions having a lower purity are more sparsely quantized based on a hue by combining a larger number of the uniformly-divided values based on the hue.

19. The method as claimed in claim 16, wherein a plurality of converted histograms are predetermined before the comparative search is performed.

20. A computer-implemented multimedia searching method using a histogram having N bins obtained by dividing a color space into N partial regions, the method comprising:
defining the histogram obtained by more closely uniform-quantizing the color space in the regions having a purity lower than a threshold value and by more sparsely uniform-quantizing the color space in the regions having a purity higher than the threshold value as a standard histogram;
converting the histogram into a histogram having the bins representing the non-uniformly-quantized color space optimized for a specified application by non-uniformly combining the bins obtained by quantizing the color space into the N partial regions; and
performing a comparative search using the converted histogram.

21. The method as claimed in claim 20, wherein the non-uniformly combining the bins representing the color space quantized into the N regions is implemented in a manner that the regions having a lower purity are more closely quantized based on brightness and purity axes by combining a smaller number of the uniformly-divided values based on the brightness and purity axes.

22. The method as claimed in claim 20, wherein the non-uniformly combining the bins representing the color space uniformly quantized into the N regions is implemented in a manner that the regions having a lower purity are more sparsely quantized based on a hue by combining a larger number of the uniformly-divided values based on the hue.

23. A computer-implemented method for forming a histogram that expresses feature information, comprising:
(a) forming a standard histogram by performing a uniform quantization or a semi-uniform quantization with respect to information for expressing the histogram as a multimedia feature; and
(b) converting the standard histogram into a converted histogram having a non-uniformly quantized feature corresponding to a specified application, wherein the converted histogram is formed by non-uniformly combining the uniformly quantized feature information of the standard histogram.

24. The method as claimed in claim 23, wherein the semi-uniform quantization is performed by uniformly dividing some regions closely and uniformly dividing other regions sparsely, based on a threshold value.

25. The method of claim 23, wherein the histogram is obtained by dividing a color space into N partial regions.

* * * * *